US008773845B2

(12) United States Patent
Leung (10) Patent No.: US 8,773,845 B2
(45) Date of Patent: Jul. 8, 2014

(54) DOCKING STATION FOR MEDIA PLAYER

(75) Inventor: Wilson Wai Sing Leung, Tai Po (HK)

(73) Assignee: Alco Electronics Limited, Quarry Bay, Hong Kong Sar (CN)

( * ) Notice: Subject to any disclaimer, the term of this patent is extended or adjusted under 35 U.S.C. 154(b) by 404 days.

(21) Appl. No.: 13/018,625

(22) Filed: Feb. 1, 2011

(65) Prior Publication Data

US 2012/0188689 A1 Jul. 26, 2012

(30) Foreign Application Priority Data

Jan. 21, 2011 (HK) .................................. 11100656.2

(51) Int. Cl.
*H05K 5/00* (2006.01)
(52) U.S. Cl.
USPC ............ 361/679.01; 361/679.41; 361/679.55; 361/679.56; 361/679.06
(58) Field of Classification Search
CPC ... G06F 1/1632; G06F 1/1626; G06F 1/1613; G06F 1/1643; G06F 1/1607; A47F 5/02; A47B 91/005; A47B 97/04; F16M 13/00; F16M 11/08; F16M 2200/021
USPC ............. 361/679.01, 679.41, 679.55, 679.56, 361/679.06; 248/125.7, 130–131, 278.1, 248/349.1, 371, 919
See application file for complete search history.

(56) References Cited

U.S. PATENT DOCUMENTS

| 6,963,487 | B2 | 11/2005 | Billington et al. |
| 6,996,077 | B1 | 2/2006 | Suenaga et al. |
| 7,352,567 | B2 * | 4/2008 | Hotelling et al. ........ 361/679.55 |
| 7,599,177 | B2 * | 10/2009 | Jaffe et al. ................ 361/679.41 |
| 7,606,526 | B2 | 10/2009 | Patsiokas et al. |

(Continued)

FOREIGN PATENT DOCUMENTS

| CN | 1414441 A | 4/2003 |
| CN | 2935379 Y | 8/2007 |

(Continued)

*Primary Examiner* — Robert J Hoffberg
*Assistant Examiner* — Hung Dang
(74) *Attorney, Agent, or Firm* — Leydig, Voit & Mayer, Ltd.

(57) ABSTRACT

A docking station for an iPad or the like, having a base, a support on the base for releasably holding an iPad, an operating circuit for amplifying an audio signal received from the iPad, and speakers connected to the operating circuit for reproducing sound based on the audio signal amplified by the operating circuit. The support is movable between two angular positions for supporting the iPad in portrait and landscape orientations. The support is also movable to change the direction in which the iPad faces, between left and right orientations.

8 Claims, 14 Drawing Sheets

(56) References Cited

U.S. PATENT DOCUMENTS

| | | |
|---|---|---|
| 7,624,955 B2 | 12/2009 | McGill |
| 7,636,235 B2 | 12/2009 | Langberg et al. |
| 2003/0223185 A1 | 12/2003 | Doczy et al. |
| 2003/0235029 A1 | 12/2003 | Doherty et al. |
| 2006/0013411 A1 | 1/2006 | Lin |
| 2006/0043253 A1 | 3/2006 | Huang et al. |
| 2006/0116009 A1 | 6/2006 | Langberg et al. |
| 2006/0280045 A1 | 12/2006 | Ritsher et al. |
| 2007/0035917 A1 | 2/2007 | Hotelling et al. |
| 2007/0288678 A1 | 12/2007 | Langberg et al. |
| 2008/0006746 A1 | 1/2008 | Volochine |
| 2008/0089547 A1 | 4/2008 | Young et al. |
| 2008/0158411 A1 | 7/2008 | Firnberg |
| 2009/0080684 A1 | 3/2009 | Groset et al. |
| 2009/0219262 A1 | 9/2009 | Champion et al. |
| 2010/0059650 A1* | 3/2010 | Kaneko ................. 248/372.1 |
| 2011/0046757 A1 | 2/2011 | Leung |
| 2011/0157801 A1 | 6/2011 | Satterfield |
| 2011/0170256 A1 | 7/2011 | Lee |
| 2012/0189156 A1 | 7/2012 | Leung |

FOREIGN PATENT DOCUMENTS

| | | |
|---|---|---|
| CN | 101341479 A | 1/2009 |
| CN | 201696820 U | 1/2011 |
| CN | 201696825 U | 1/2011 |
| DE | 203 18 230 U1 | 3/2004 |
| GB | 2 451 894 A | 2/2009 |
| WO | WO 2007/070543 A2 | 6/2007 |

\* cited by examiner

DOCKING STATION FOR MEDIA PLAYER

The present invention relates to a docking station for a portable media (or multimedia) player which is an electronic device including media playing functions for playing audio and/or video contents, such as an iPod, iPhone or iPad.

BACKGROUND OF THE INVENTION

Media players of the portable type concerned in general are becoming ever increasingly popular. Most of such media players do not include built-in speakers and hence require use of external earphones, or any such speakers are not of adequate quality to meet higher expectations. Docking stations equipped with larger, better quality speakers are available on the markets for connecting such media players to play better-quality sound, but some of them suffer from shortcomings as to flexibility in positioning the media players.

The invention seeks to mitigate or at least alleviate such shortcomings by providing a new or otherwise improved docking station for a media player.

SUMMARY OF THE INVENTION

According to the invention, there is provided a docking station for a media player, having a base for resting on a horizontal surface, a support on the base and adapted for releasably holding a said media player, an operating circuit for amplifying an audio signal received from a said media player, and at least one speaker connected to the operating circuit for reproducing sound based on an audio signal amplified by the operating circuit. The support is movable to two angular positions for supporting a said media player in respective portrait and landscape orientations. The support is also movable to change the direction in which a said media player supported on the support faces in a range as between left and right.

Preferably, the support is movable angularly about a substantially vertical axis in order to change the direction in which a said media player supported on the support faces in a range as between left and right.

Preferably, the range of direction in which a said media player supported on the support faces is changeable is up to 360 degrees.

It is preferred that the range is limited to about 180 degrees.

In a preferred embodiment, the base has a first part and a second part rotatably connected to the first part, and the support is carried by the second part for turning with the second part in order to change the direction in which a said media player supported on the support faces in a range as between left and right.

More preferably, the second part of the base is connected to the first part by means of a swivel connection.

More preferably, the second part of the base is connected to the first part via a bearing.

It is preferred that the second part of the base is located above the first part.

It is further preferred that the base has a substantially conical or frusto-conical shape.

In a preferred embodiment, the support is pivotably connected to the base for pivotal movement to two angular positions for supporting a said media player selectively in either the portrait or the landscape orientation.

It is preferred that the support is pivotably connected to the second part of the base for pivotal movement to two angular positions for supporting a said media player selectively in either the portrait or the landscape orientation.

It is preferred that the support is pivotably connected to the base for pivotal movement about an axis inclined at an acute angle to the horizontal, at which angle the support leans rearward.

It is further preferred that the second part of the base is rotatably connected to the first part for turning about another axis, the two axes lying on the same vertical imaginary plane.

In a preferred embodiment, the docking station includes a signal connector which is connected to the operating circuit and for connection with a said media player to transmit an audio signal to the operating circuit for amplification.

More preferably, the signal connector is located on the support.

It is preferred that the base houses the operating circuit and locates said at least one speaker.

It is preferred that the operating circuit includes a clock circuit.

It is preferred that the operating circuit includes a radio circuit.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Referring to FIGS. 1 to 14 of the drawings, there is shown a docking station 100 for a media player, such as an iPad 200, embodying the invention, which has a base 110 and a support in the form of a bracket 120 connected to the base 110 and adapted for releasably holding an iPad 200. A signal connector 130, i.e. a standard 30-pin connector for iPhone/iPad, is located on the bracket 120 for connection with the iPad 200. The connector 130 is connected to an operating circuit 190 by means of cables 131, for amplifying an audio signal transmitted by and received from the iPad 200 via the connector 130. Also included is at least one speaker, and preferably a pair of left and right main speakers 140 and a subwoofer 141 which are connected to the operating circuit 190 for reproducing sound based on an audio signal amplified by the operating circuit 190.

The base 110 has a substantially conical or frusto-conical shape as shown, for use resting upright on a horizontal surface e.g. a desktop. The base 110 has a main body 111 (first part) and a head 112 (second part) located above and rotatably connected to the main body 111 for turning about a vertical central axis X. More specifically, the head 112 is connected to the main body 111 by means of a swivel connection 150 that incorporates a ball bearing 159.

The swivel connection 150 is implemented by a cylindrical collar 151 upstanding from the top of the main body 111 and a tubular core 152 of the head 112 which extends co-axially from above into the collar 151. The ball bearing 159 fills the annular gap between and interconnects the collar 151 and the core 152, with its outer ring jammed within the collar 151 and its inner ring binding around with the core 152, ensuring smooth rotation of the head 112 relative to the main body 111 about the central axis X.

The head 112 may be turned relative to the main body 111 through an angle of up to 360 degrees, i.e. no more than one complete turn to prevent twisting of electrical cables (e.g. the connector cables 131) extending across the two base parts 111 and 112. In this particular embodiment, opposite end stops are provided to limit the range of turning to about 180 degrees i.e. 90° to the left and 90° to the right, as the design may warrant.

The main body 111 houses the operating circuit 190 and locates the main speakers 140 within opposite left and right sides of the base 110 facing forward. The subwoofer 141 is located centrally on the bottom of the main body 111, and emits sound through a bass reflex port 113 above it to the rear.

Figure 14:
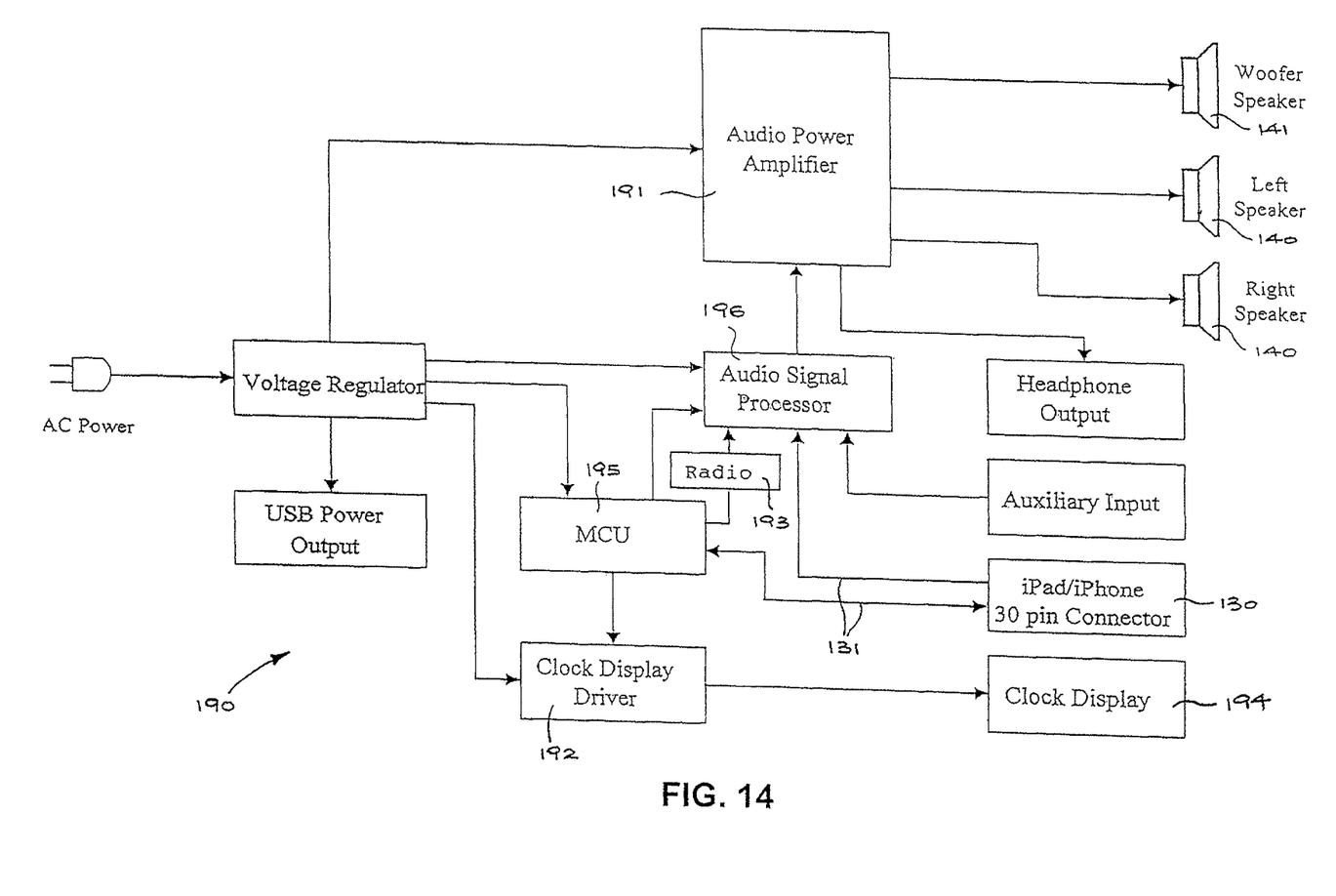
FIG. 14 is a schematic functional block diagram of an operating circuit of the docking station of FIG. 1.

The operating circuit 190 includes, amongst others, an amplifier circuit (audio power amplifier) 191, a clock circuit 192, a radio circuit 193, and an LCD display 194 on the front of the base 110, all being under the control of an MCU 195 with sound handled by an audio signal processor 196 where appropriate.

In a specific construction, the bracket 120 has a general shape resembling that of the letter "T", having a central limb 121 with a lower end 121A and a cross limb 122 with a pair of opposite left and right ends 122A and 122B. The connector 130 is located on the lower end 121A, which together serve to hold (and electrically connect) the iPad 200 by its bottom (and the socket thereat), with the left and right ends 122A and 122B being hooked and grabbing the iPad 200 (FIG. 10) across its width.

Figure 1:
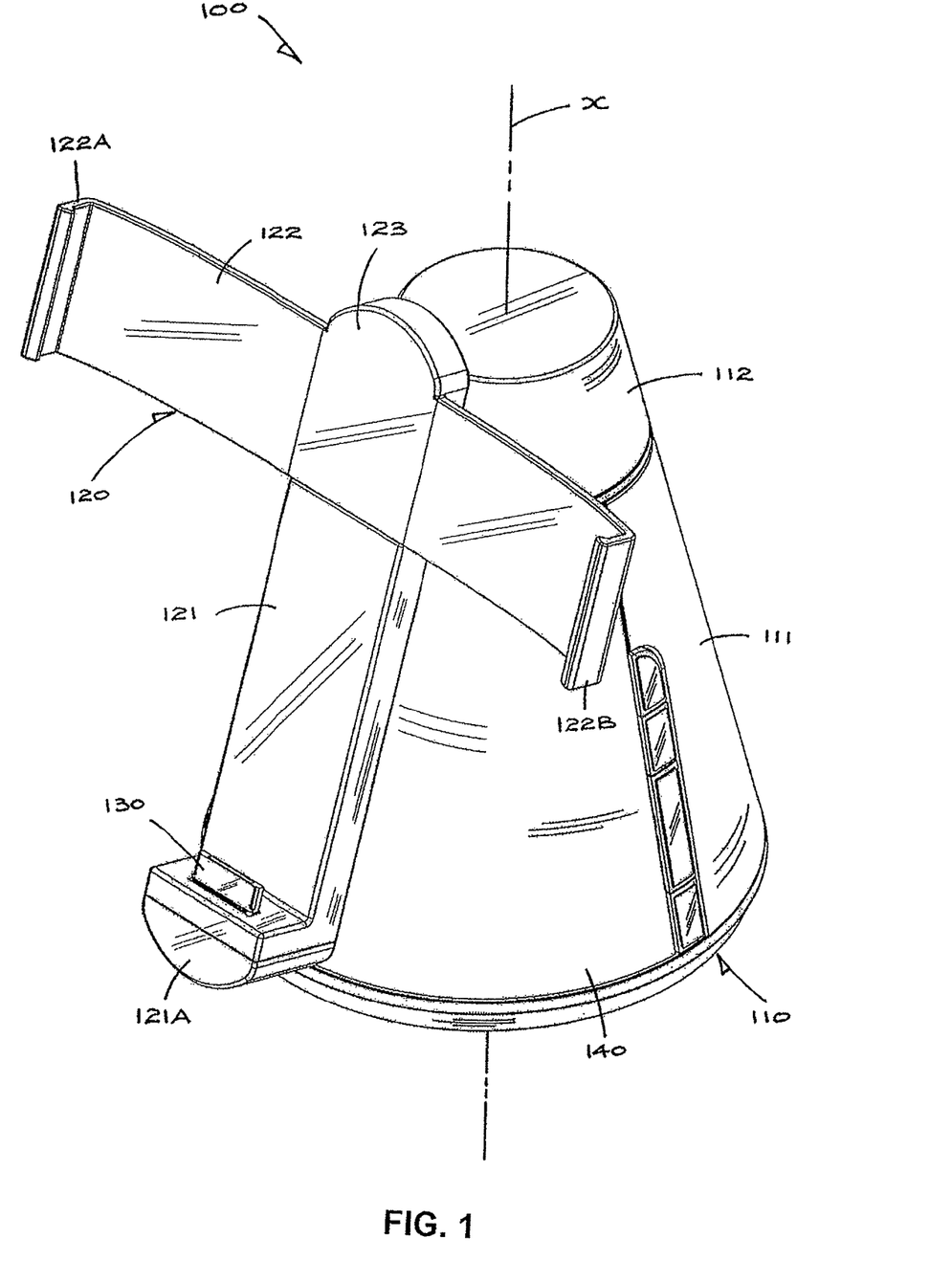
FIG. 1 is a front and right side perspective view of an embodiment of a docking station for a media player in accordance with the invention, which includes a support in a portrait orientation.
Figure 2:
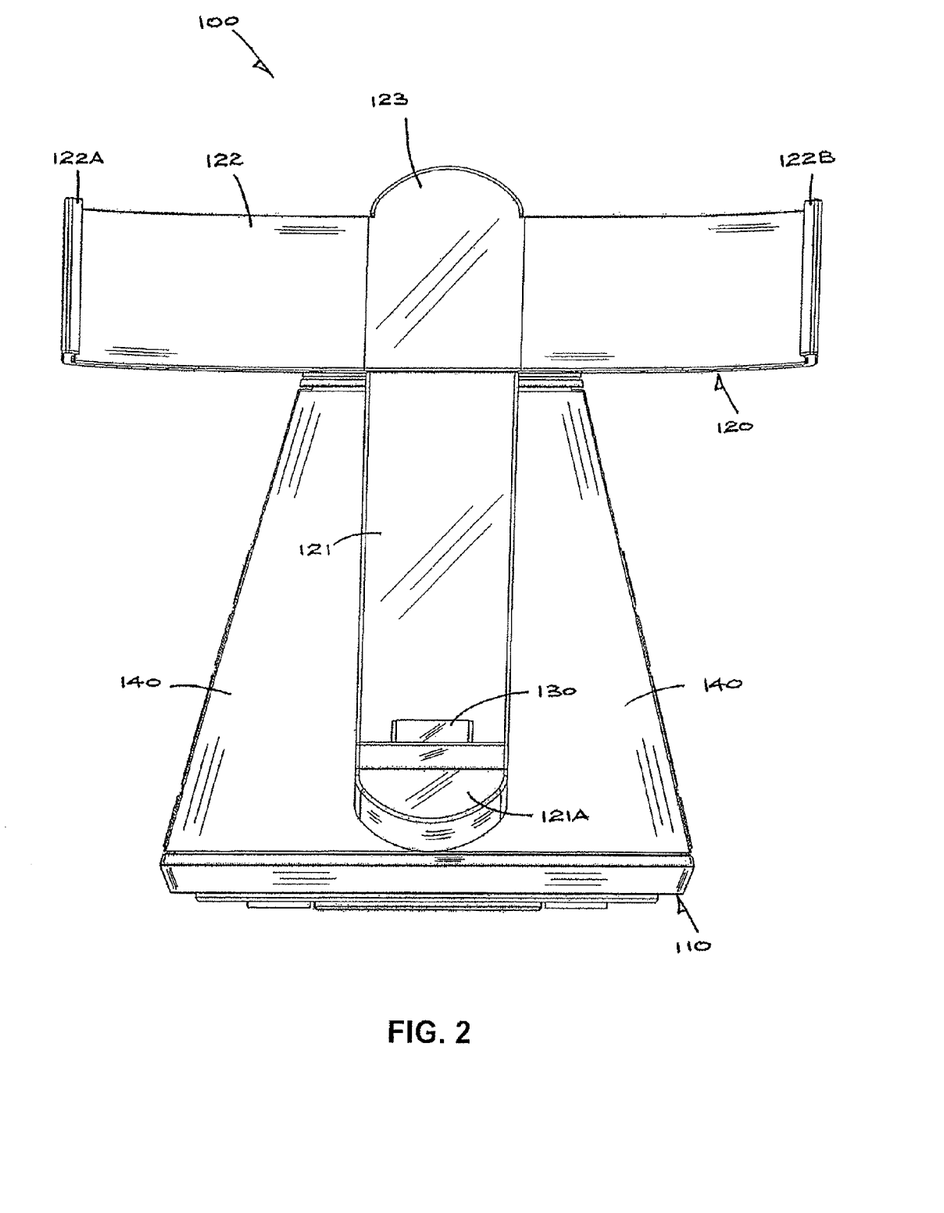
FIG. 2 is a front view of the docking station of FIG. 1.
Figure 3:
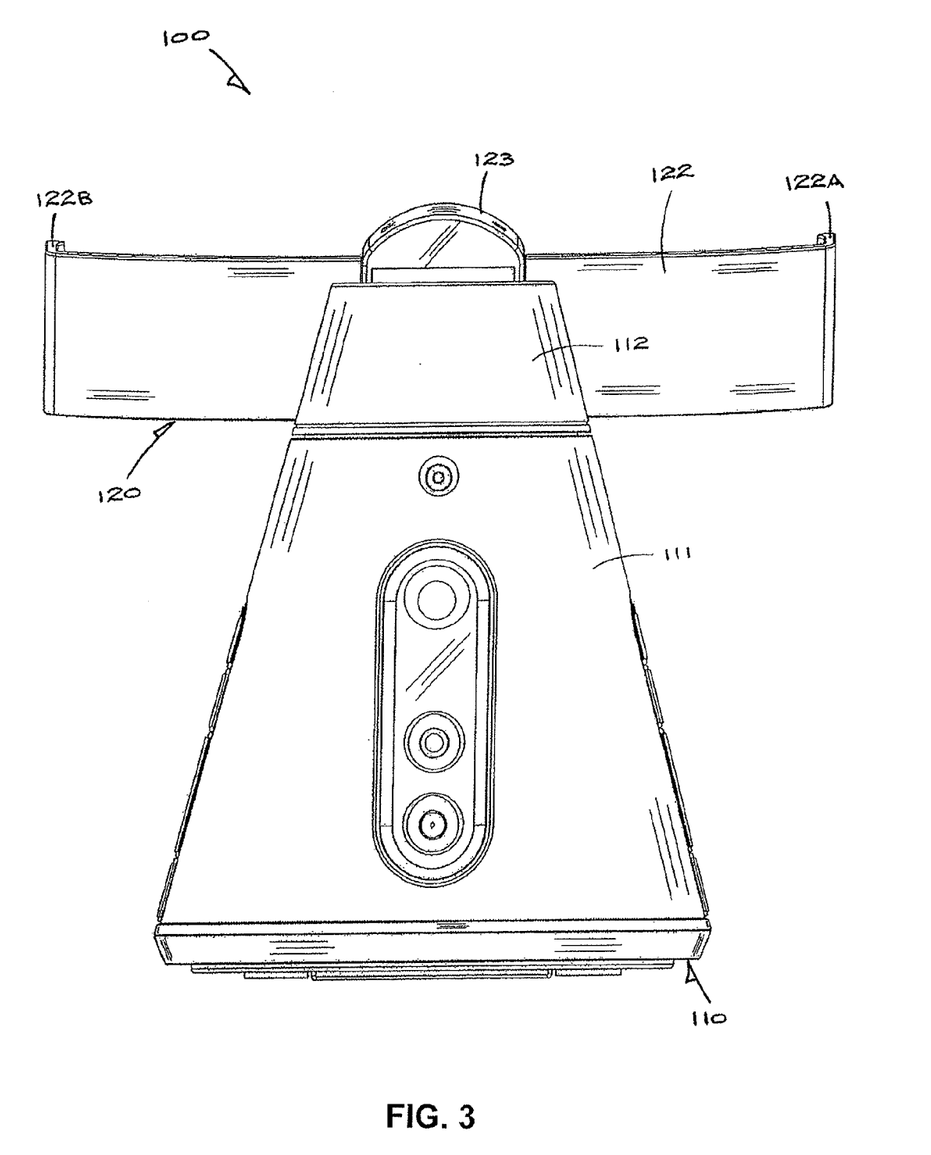
FIG. 3 is a rear view of the docking station of FIG. 1.
Figure 4:
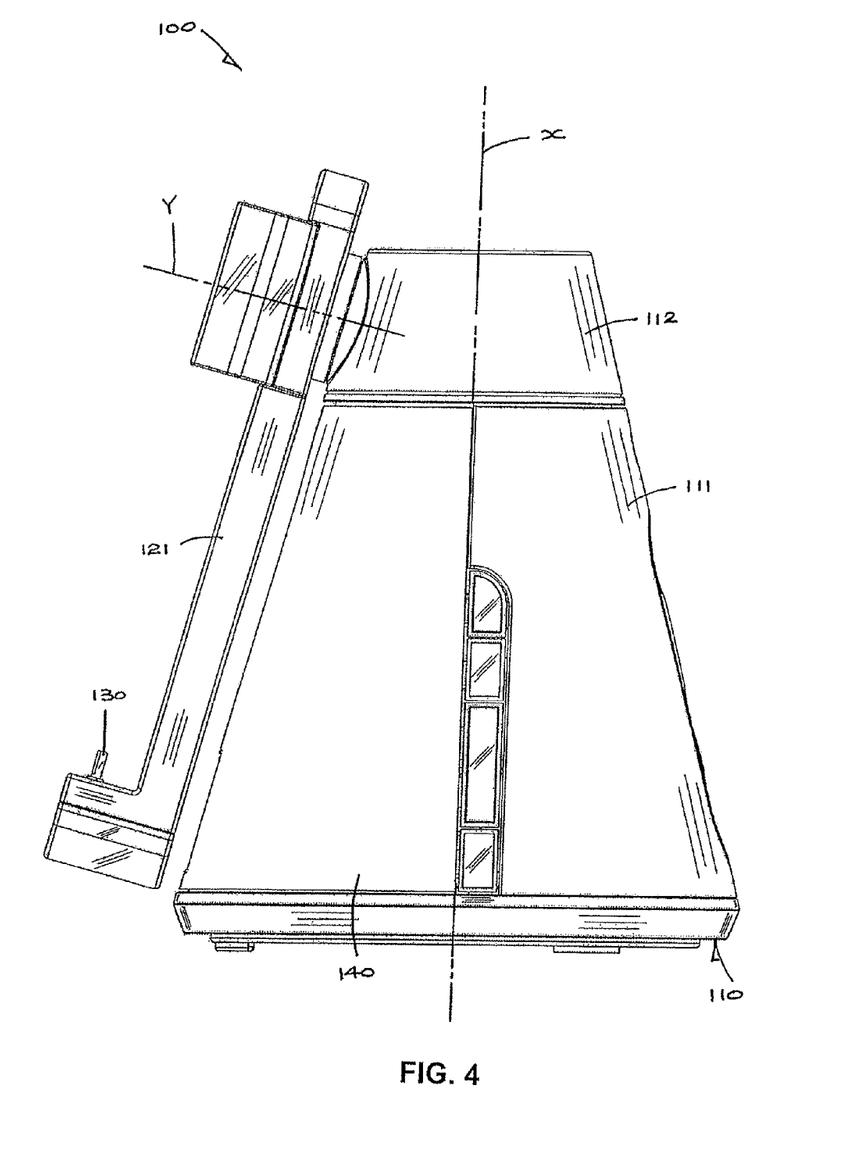
FIG. 4 is a right side view of the docking station of FIG. 1.
Figure 5:
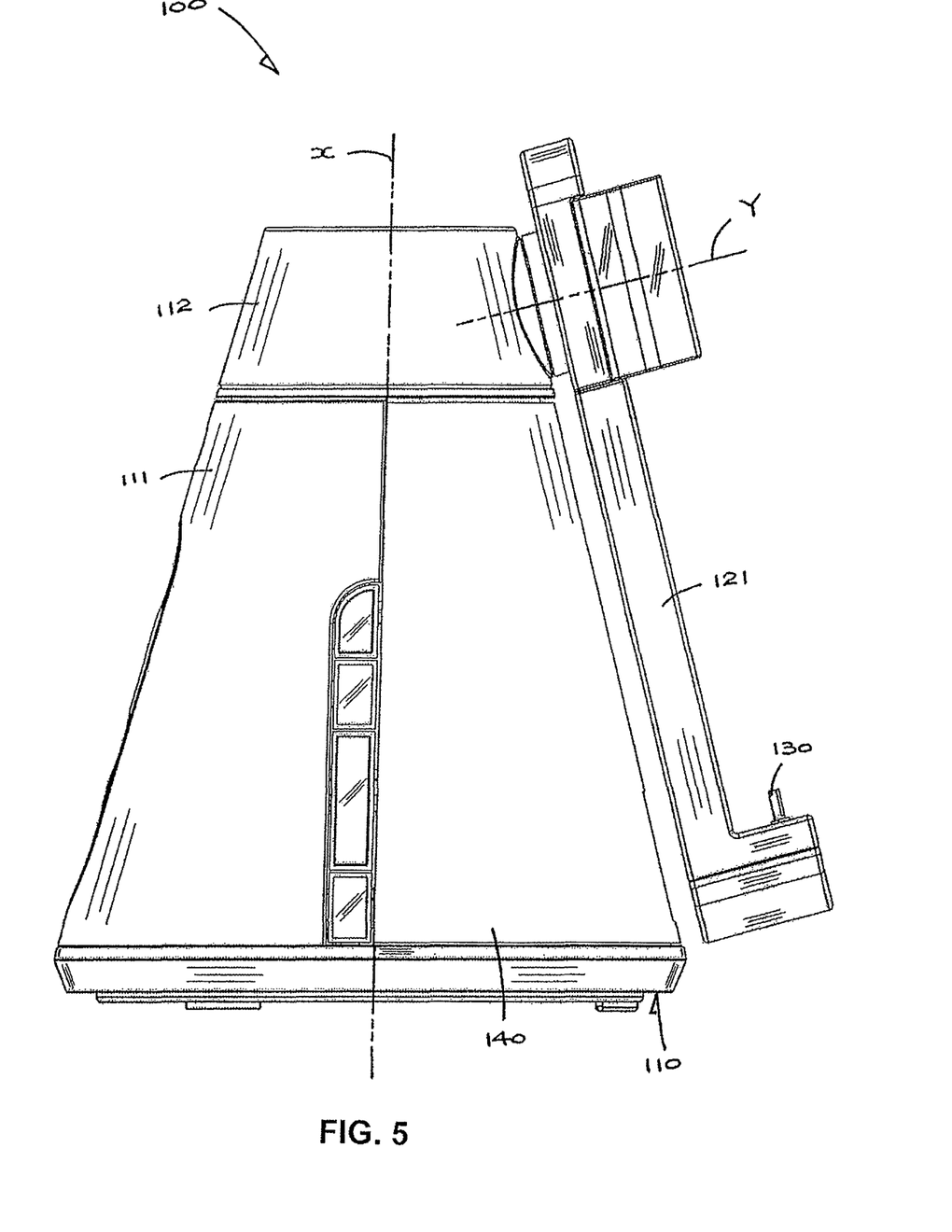
FIG. 5 is a left side view of the docking station of FIG. 1.
Figure 6:
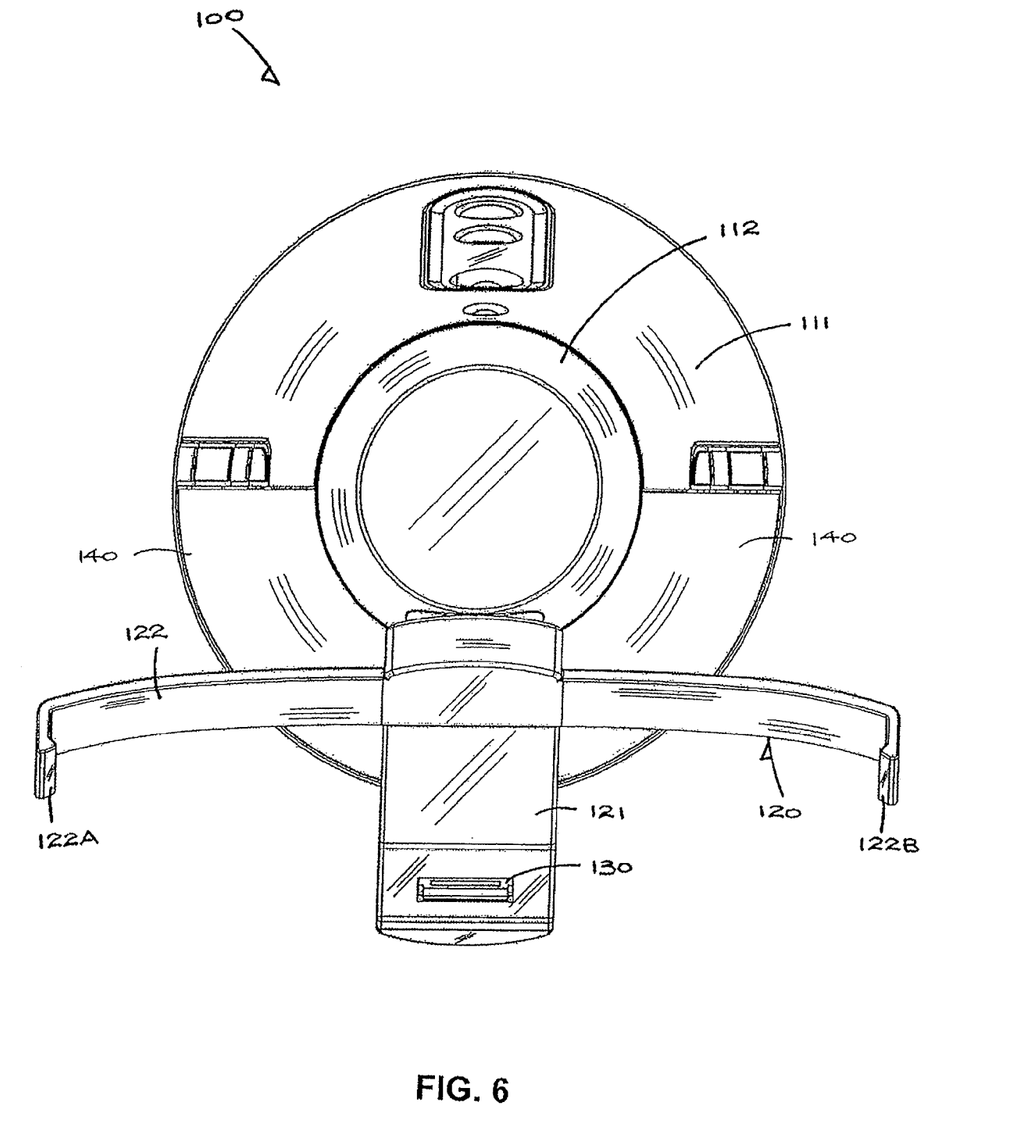
FIG. 6 is a top plan view of the docking station of FIG. 1.
Figure 7:
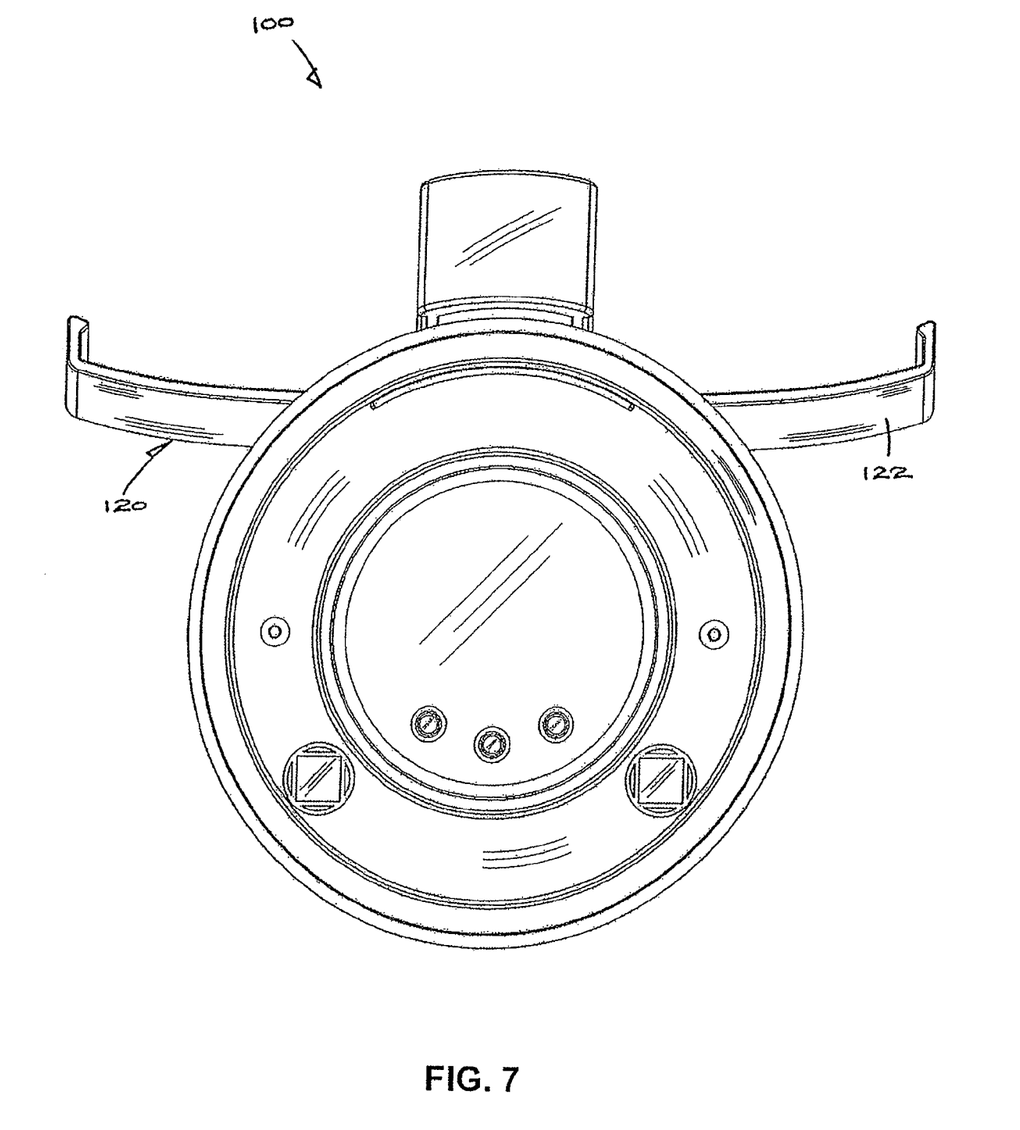
FIG. 7 is a bottom plan view of the docking station of FIG. 1.
Figure 8:
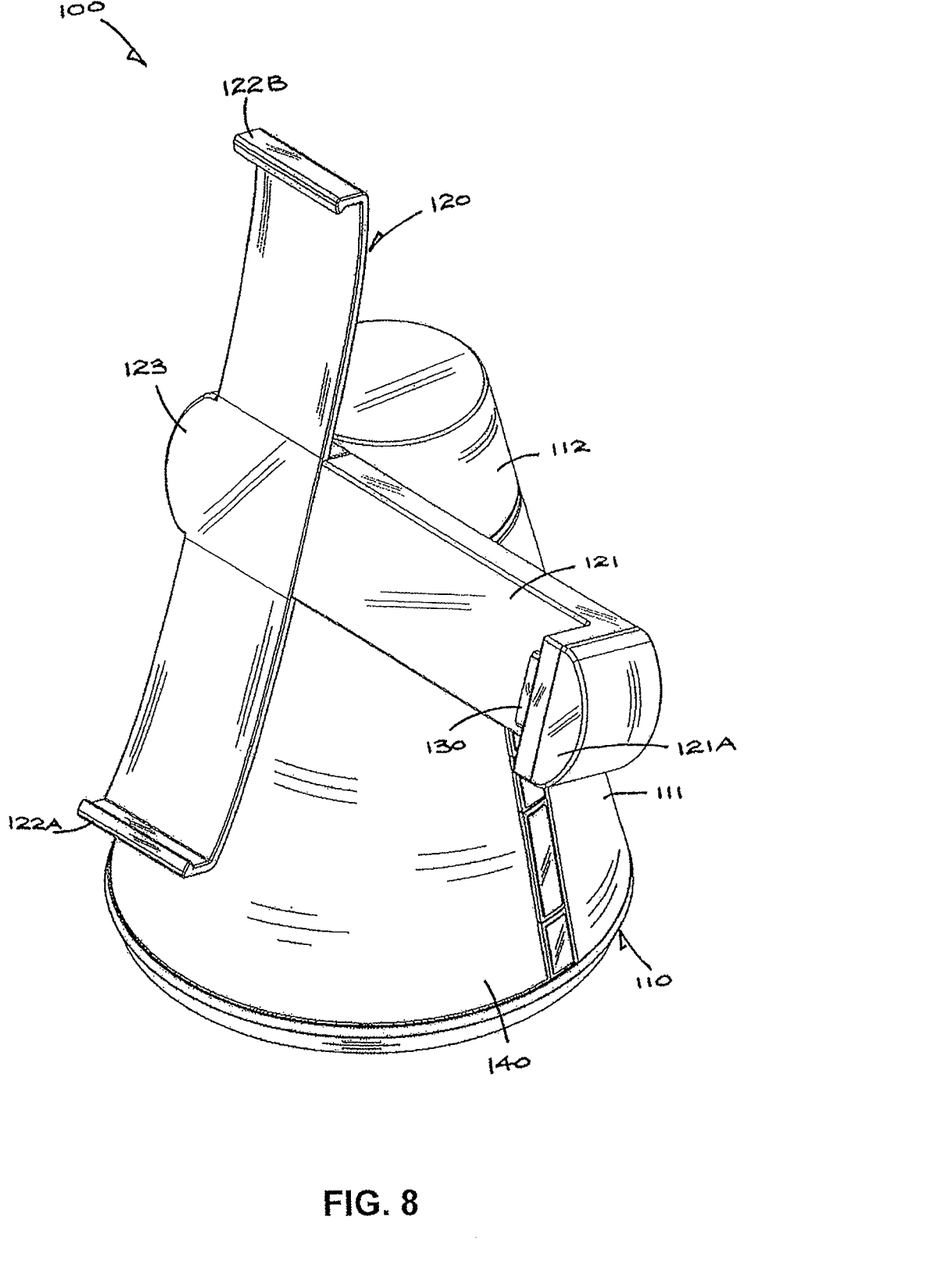
FIG. 8 is a front and right side perspective view similar to FIG. 1, showing the support turned to a landscape orientation.
Figure 9:
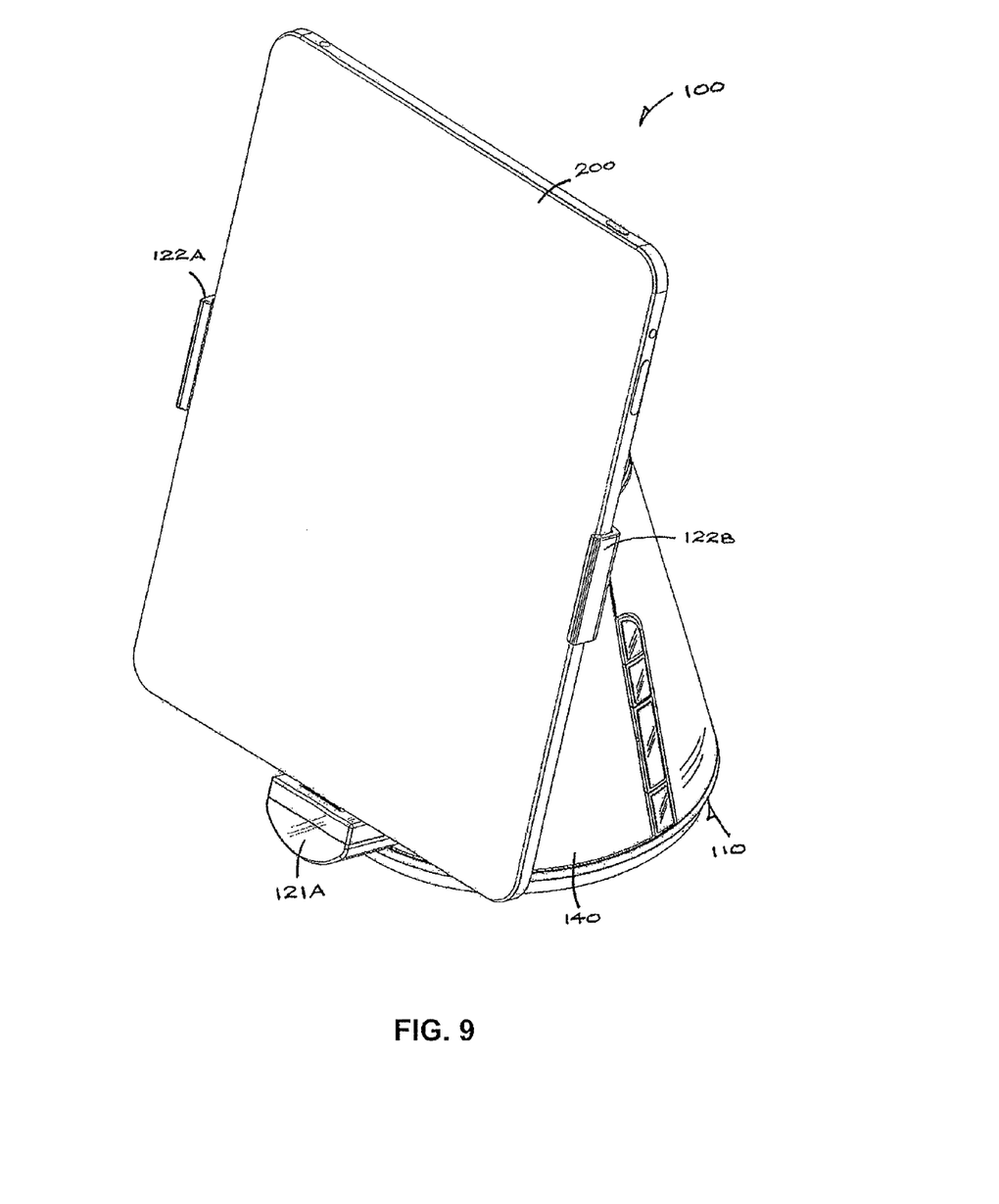
FIG. 9 is a front and right side perspective view corresponding to FIG. 1, showing the support holding a media player in a portrait orientation.
Figure 10:
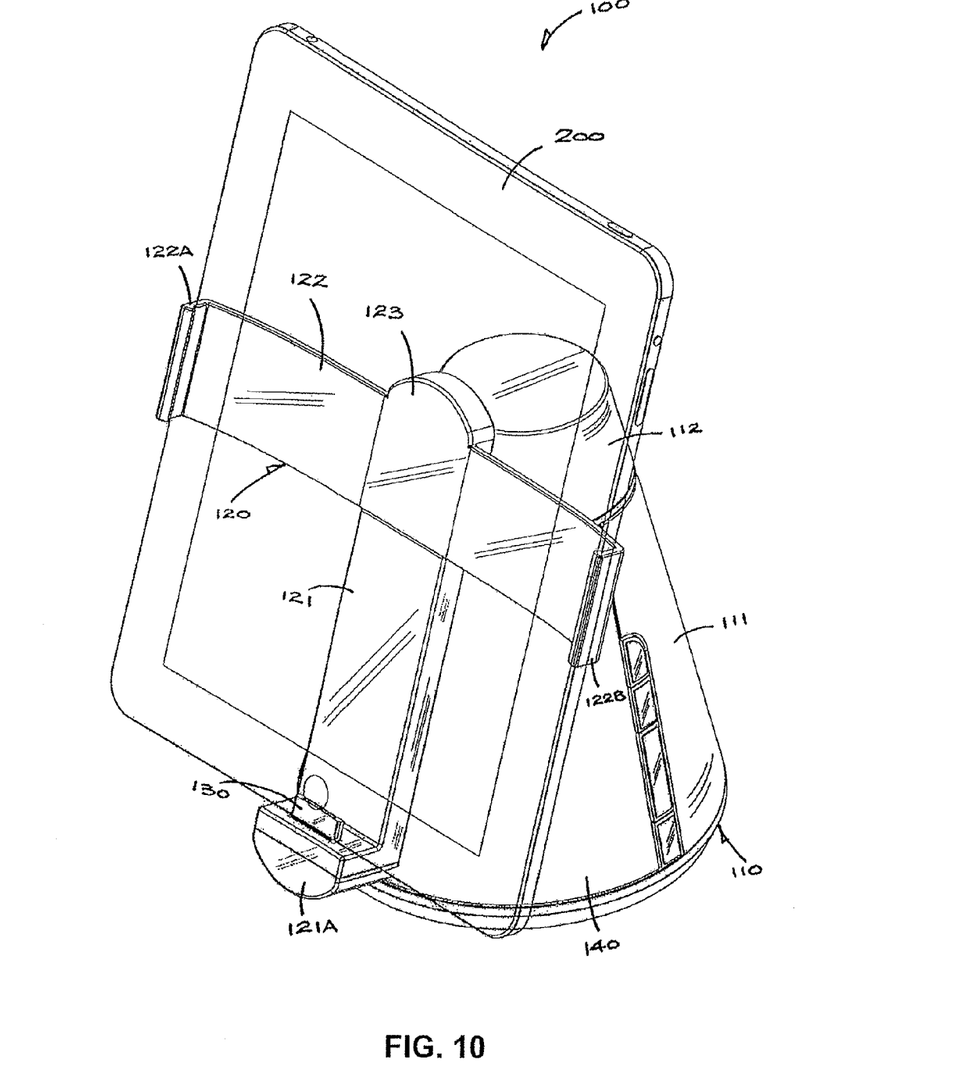
FIG. 10 is a front and right side perspective view similar to FIG. 9, showing the media player transparent to reveal features behind it.
Figure 11:
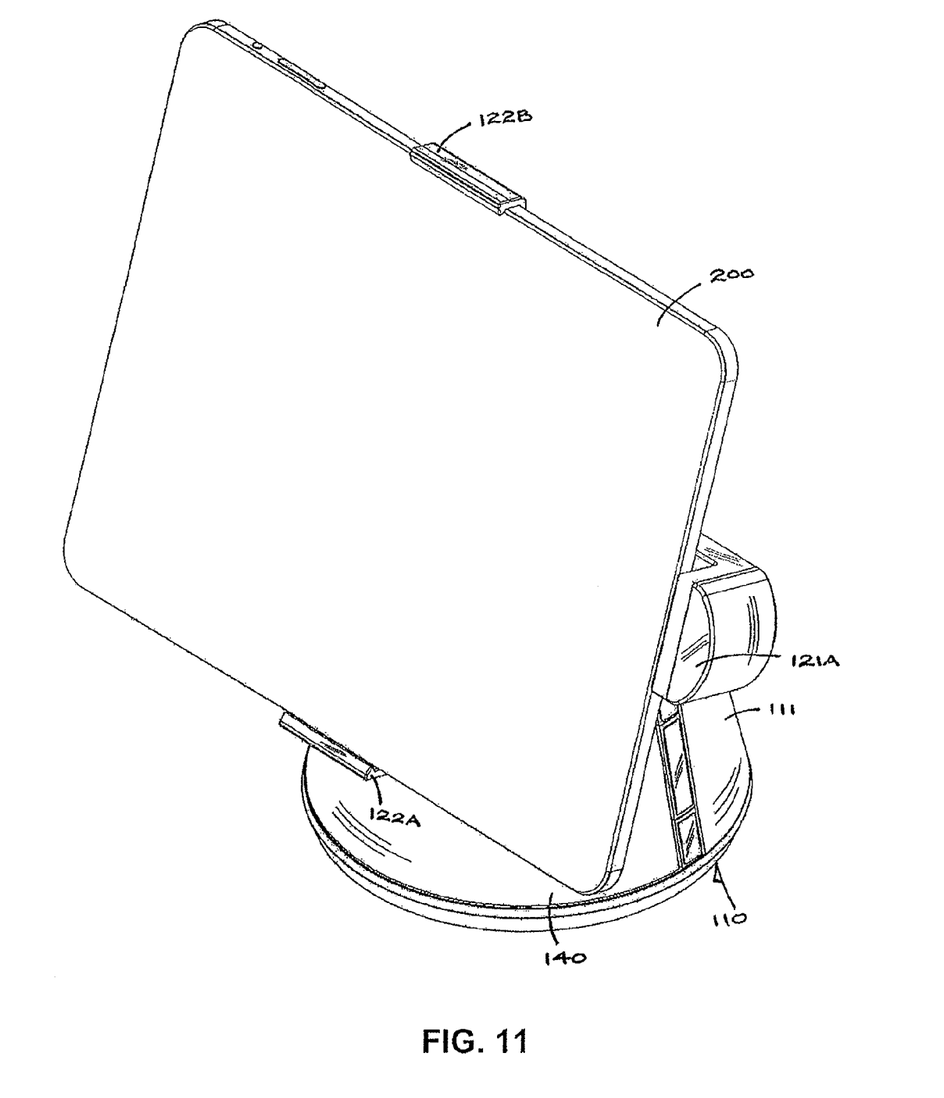
FIG. 11 is a front and right side perspective view corresponding to FIG. 8, showing the support holding a media player in a landscape orientation.
Figure 12:
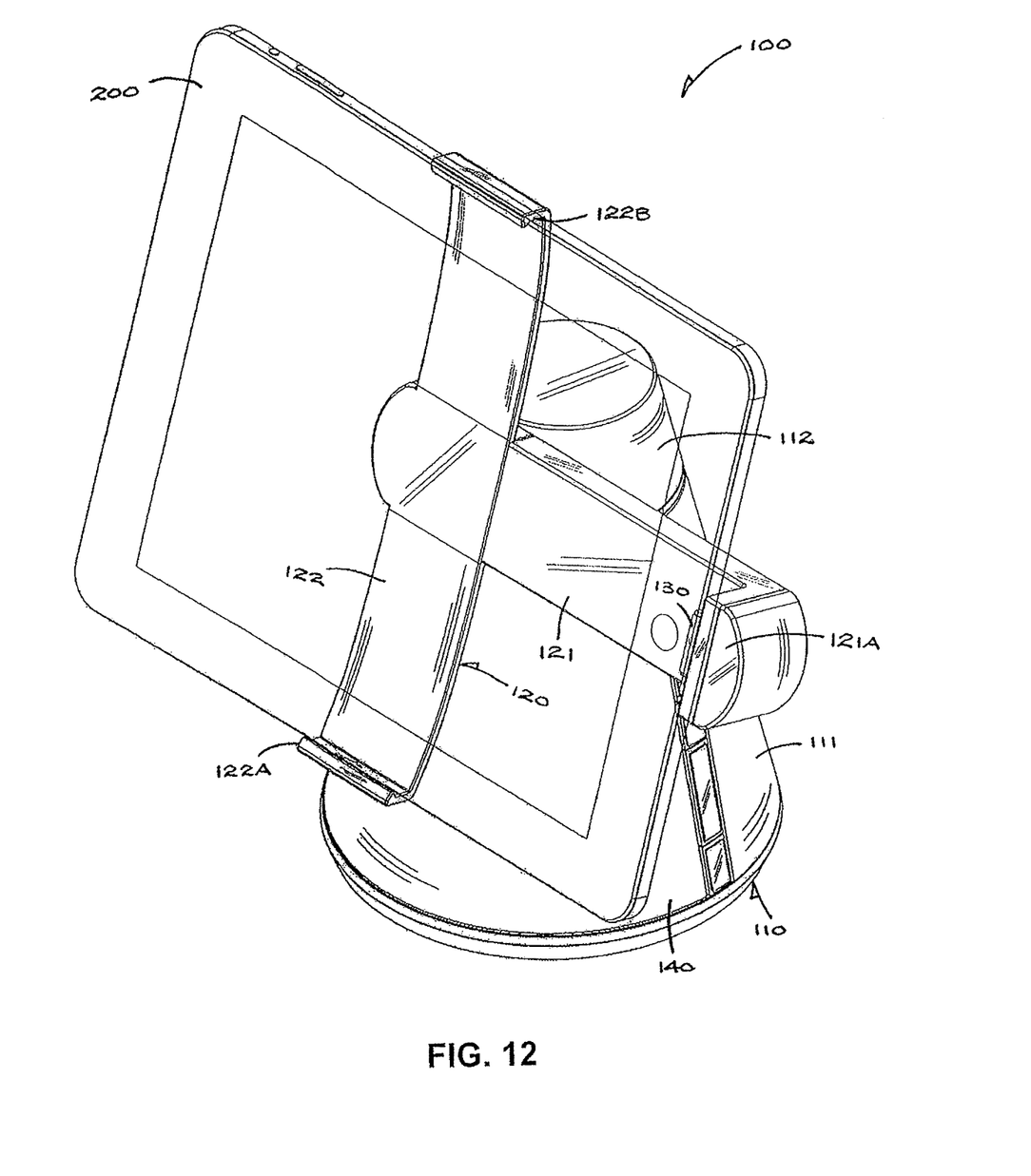
FIG. 12 is a front and right side perspective view similar to FIG. 11, showing the media player transparent to reveal features behind it.
Figure 13:
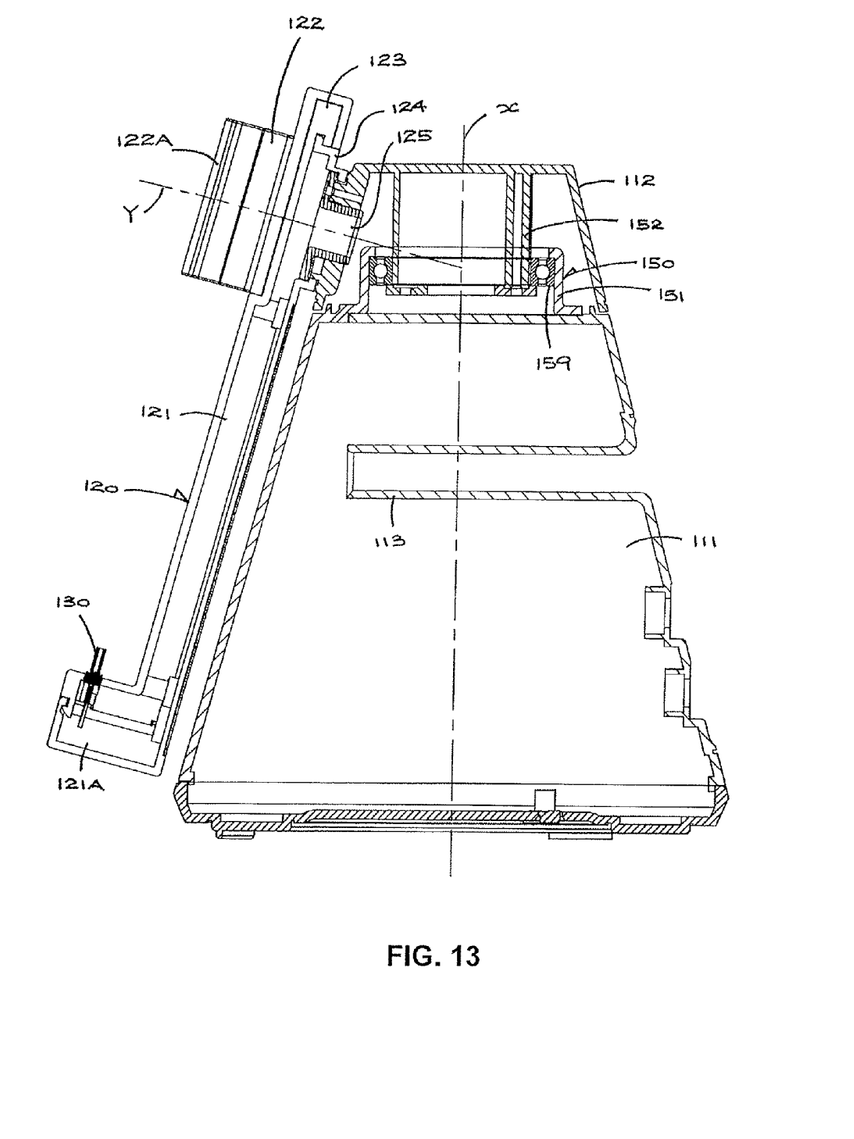
FIG. 13 is a cross-sectional right side view of the docking station of FIG. 1.

At the back of its T-junction 123, the bracket 120 is pivotably connected to the base 110, and in particular to the head 112 thereof, by means of a two-part swivel hinge for angular movement about an axis Y. The swivel hinge has first and second parts 124 and 125 inter-engaged co-axially in a circular sliding fit manner for relative rotation about the axis Y, with the first part 124 fixed partially within the back of the T-junction 123 and the second part 125 plugged into the front of the head 112 (FIG. 13). Both hinge parts 124 and 125 are centrally hollow through which the cables 131 from the connector 130 runs along inside the bracket 120 into the head 112 and then the main body 111 reaching the operating circuit 190.

The bracket 120 may be rotated about the head 112, or relative to the overall base 110, through an angle of 90° clockwise or anti-clockwise to turn the iPad 200 from a portrait orientation (FIGS. 9 and 10) to a landscape orientation (FIGS. 11 and 12), or vice versa. In general, the bracket 120 is movable to or between two angular positions for supporting the iPad 200 in the portrait and landscape orientations respectively.

By reason of the head 112 being rotatable about the main body 111, the bracket 120, which is connected to and carried by the head 112, is angularly movable to turn with the head 112 about the vertical central axis X, thereby changing the direction in which the iPad 200 on the bracket 120 faces in a range as between left and right. In other words, the bracket 120 is movable to face the iPad 200 supported thereon in a direction of a range between left and right. The range of direction in which the supported iPad 200 faces is dictated by the extent to which the head 112 is rotatable about the main body 111, i.e. up to 360 degrees or, as in the described embodiment, limited to about 180 degrees i.e. 90° to the left and 90° to the right.

The axis Y, about which the bracket 120 is pivotable relative to the base 110, is inclined at an acute angle (e.g. approximately about 20°) to the horizontal, at which angle the bracket 120 leans rearward as an optimal angle for viewing the iPad 200 mounted on the bracket 120. This axis Y and the vertical central axis X of the base 110 lie on the same vertical imaginary plane.

It is envisaged that the docking station of the subject invention may be used with a media playing device(s) other than iPad, iPhone or iPad Touch, etc. The basic concept is applicable to docking stations for all and future media players in general.

The invention has been given by way of example only, and various other modifications of and/or alterations to the described embodiment may be made by persons skilled in the art without departing from the scope of the invention as specified in the appended claims.

The invention claimed is:
1. A docking station comprising:
a frusto-conical base having a bottom surface for resting on a flat surface, a central axis transverse to the bottom surface, and a frusto-conical side surface that is substantially symmetrical about the central axis, wherein
a tangent to the frusto-conical side surface of the base and intersecting the central axis forms a first fixed acute angle with the central axis;
the base comprises a main body including the bottom surface and a head that is coaxial with and mounted on the main body opposite the bottom surface, and
the base includes a bearing rotationally connecting the main body to the head so that the head may rotate freely with respect to the main body about the central axis;
a support rotatably mounted on the head for releasably holding a media player on the docking station, wherein
the support lies substantially in a plane that forms substantially the first fixed acute angle with the central axis,
the support rotates about a rotational axis that is fixed in position with respect to the head so that a media player mounted on the support can be selectively rotated between landscape and portrait orientations,
the rotational axis intersects the central axis, and
the rotational axis forms a second fixed acute angle with the central axis;
an operating circuit located within the base for amplifying an audio signal received from a media player mounted on the docking station; and a speaker within the base and electrically connected to the operating circuit for reproducing sound based on the audio signal amplified by the operating circuit.

2. The docking station as claimed in claim 1, wherein the operating circuit includes a clock circuit.

3. The docking station as claimed in claim 1, wherein the operating circuit includes a radio circuit.

4. The docking station as claimed in claim 1, wherein the support includes a central limb and a cross limb, which is transverse to the central limb, for retaining a media player mounted on the docking station.

5. The docking station as claimed in claim 4, including a signal connector which is electrically connected to the operating circuit for electrically connecting a media player that is mounted on the support to the operating circuit.

6. The docking station as claimed in claim 5 wherein the central limb has an end projecting transverse to the plane of the support.

7. The docking station as claimed in claim 6, wherein the signal connector is mounted on the end of the central limb of the support.

8. The docking station as claimed in claim 1, wherein the sum of the first and second fixed acute angles equals substantially 90 degrees.

\* \* \* \* \*